United States Patent
Doan et al.

(10) Patent No.: US 9,386,341 B2
(45) Date of Patent: Jul. 5, 2016

(54) OPTIMIZED HTML5 ELECTRONIC PROGRAMMING GUIDE APPLICATION

(71) Applicant: Espial Group Inc., Ottawa (CA)

(72) Inventors: Dat Doan, Ontario (CA); Kumanan Yogaratnam, Ontario (CA)

(73) Assignee: Espial Group Inc., Ottawa (CA)

( * ) Notice: Subject to any disclaimer, the term of this patent is extended or adjusted under 35 U.S.C. 154(b) by 134 days.

(21) Appl. No.: 13/890,775

(22) Filed: May 9, 2013

(65) Prior Publication Data

US 2014/0337888 A1    Nov. 13, 2014

(51) Int. Cl.
| | |
|---|---|
| H04N 5/445 | (2011.01) |
| H04N 21/431 | (2011.01) |
| H04N 21/433 | (2011.01) |
| H04N 21/482 | (2011.01) |
| H04N 21/61 | (2011.01) |
| H04N 21/81 | (2011.01) |
| H04N 21/8543 | (2011.01) |

(52) U.S. Cl.
CPC ....... *H04N 21/4314* (2013.01); *H04N 21/4331* (2013.01); *H04N 21/4332* (2013.01); *H04N 21/4821* (2013.01); *H04N 21/6125* (2013.01); *H04N 21/6175* (2013.01); *H04N 21/8173* (2013.01); *H04N 21/8543* (2013.01)

(58) Field of Classification Search
CPC ................................................. H04N 21/26283
USPC .......................................................... 725/39
See application file for complete search history.

(56) References Cited

U.S. PATENT DOCUMENTS

| | | | | |
|---|---|---|---|---|
| 2002/0049971 | A1* | 4/2002 | Augenbraun et al. | 725/39 |
| 2007/0028265 | A1* | 2/2007 | D'Souza | C07D 333/22 725/45 |
| 2009/0007182 | A1* | 1/2009 | Baldwin et al. | 725/54 |
| 2009/0100465 | A1* | 4/2009 | Kulakowski | 725/39 |
| 2012/0099494 | A1 | 4/2012 | Salinger | |
| 2012/0144416 | A1* | 6/2012 | Wetzer et al. | 725/14 |
| 2013/0014138 | A1 | 1/2013 | Bhatia et al. | |
| 2013/0219429 | A1 | 8/2013 | Hirsch et al. | |
| 2014/0149596 | A1* | 5/2014 | Emerson, III | 709/231 |

FOREIGN PATENT DOCUMENTS

WO    WO 2012/051539 A2    4/2012

OTHER PUBLICATIONS

PCT International Search Report and Written Opinion dated Jul. 22, 2014 for PCT/CA2014/050440.

* cited by examiner

*Primary Examiner* — Junior Mendoza
(74) *Attorney, Agent, or Firm* — Carter, DeLuca, Farrell & Schmidt, LLP

(57) ABSTRACT

An electronic programming guide (EPG) data manager module is provided. The EPG data module provides an event driven infrastructure to provide EPG data to a hypertext markup language 5 (HTML5) applications. The HTML5 EPG application presents an EPG data window in a user interface on a display device. The EPG data is provided to the EPG application in scriptable data objects generated to be rendered by the HTML5 EPG application based upon the EPG data window to be presented.

22 Claims, 6 Drawing Sheets

OPTIMIZED HTML5 ELECTRONIC PROGRAMMING GUIDE APPLICATION

TECHNICAL FIELD

The present disclosure relates to electronic programming guides (EPG) and in particular to management of EPG data and navigation in a hypertext markup language 5 (HTML5) based EPG application.

BACKGROUND

Set-top boxes, Smart TVs, tablets or smartphones can provide an electronic programming guide (EPG) to enable a user to navigate programming schedules and other broadcast media programming with continuously updated time related EPG information for current and upcoming programs. The EPGs are presented in an interactive user interface allowing the user to navigate programs based upon channel (or source) and time to select specific programs for viewing or recording. The EPGs requires data which is typically provided by a service provider and can span a defined time period, typically but not limited to 7 to 14 days, and is provided in a compressed data format.

In order to present the EPG, the EPG data is retrieved via a network or pushed to the device, the files are then decompressed and the user interface is generated to present the EPG. Hypertext Markup Language 5 (HTML5), as developed by the World Wide Web Consortium (W3C) and JavaScript (JS), as defined in the ECMA-262 specification and ISO/IEC 16262, EPG implementations provide flexibility in user interface design; however they can be memory and processor intensive when working with large datasets such as provided in EPG data. The EPG data handling to generate the EPG results in a number of performance problems and can utilize a large amount of memory resources. There are currently a number of approaches to creating an EPG application in HTML. A first approach is to use a native visual plug-in that manages the EPG data and the rendering of the data in the user interface, which provides optimal performance but provides limited ability to customize the display of the EPG data and does not leverage the flexibility of HTML5. A second approach manages the EPG data and display entirely in HTML/JS implementation, which makes navigation of the EPG data slow and memory intensive since the EPG data needs to be cached in JS and all the logic of the EPG navigation needs to be done via JS and HTML5. For example a byte of compressed EPG data may result in a 100 fold increase in data size when loaded into JS and formatted in HTML. Creating an HTML5 EPG application is very complex since the HTML5 EPG application needs to handle all the aspects of the EPG application including, navigation, rendering, data management which can be taxing on the limited processing and memory resources in device such as set-top boxes, Smart TVs, tablets and smartphones.

Accordingly, systems and methods that enable improved EPG data management in the presentation of an EPG in an HTML5 application remains highly desirable.

BRIEF DESCRIPTION OF THE DRAWINGS

Further features and advantages of the present disclosure will become apparent from the following detailed description, taken in combination with the appended drawings, in which.

It will be noted that throughout the appended drawings, like features are identified by like reference numerals.

DETAILED DESCRIPTION

Figure 1:
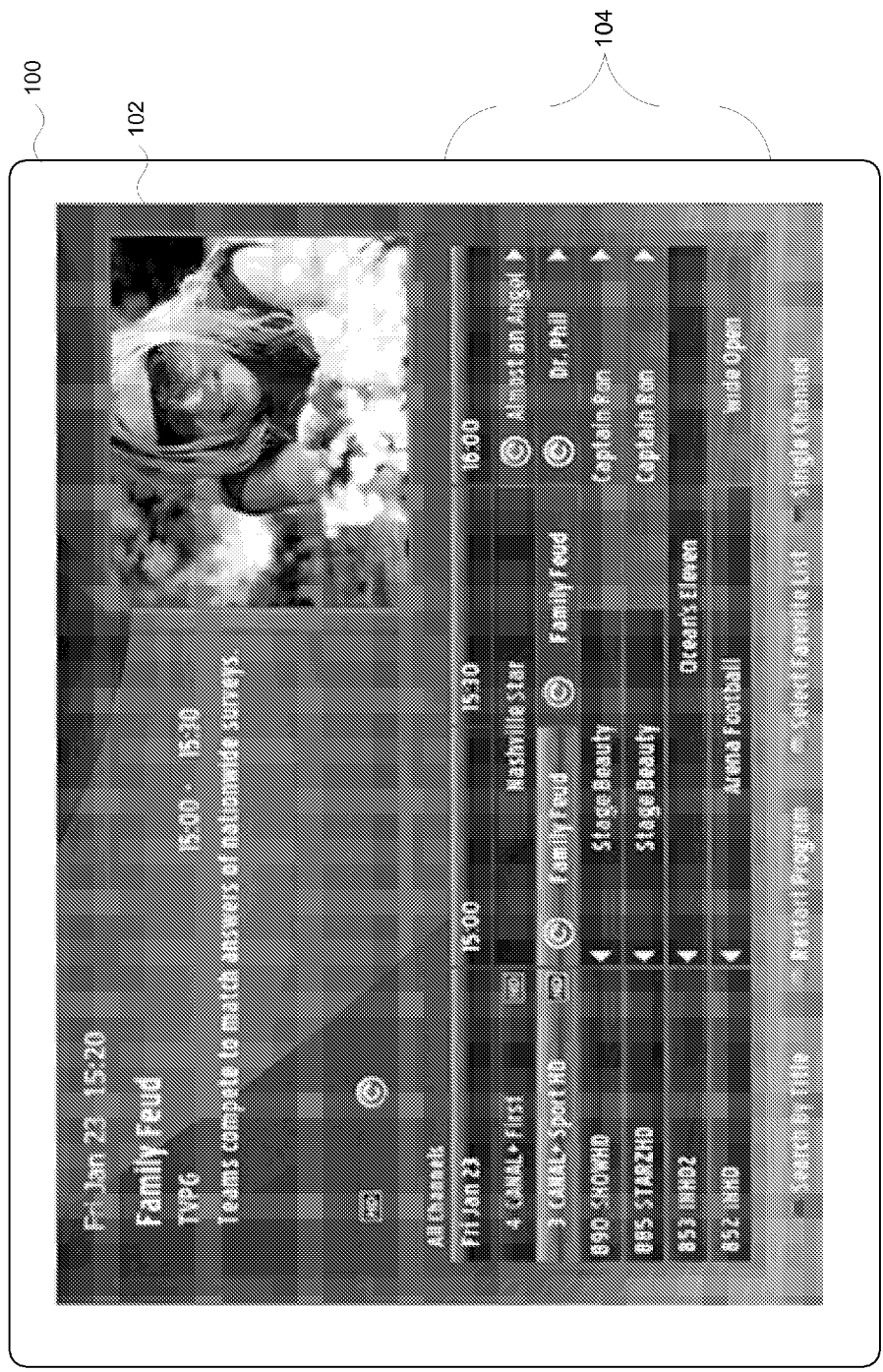
FIG. 1 shows a representation of an electronic programming guide.

In accordance with an aspect of the present disclosure there is provided a system for presenting an electronic program guide (EPG) user interface (UI) on a display device, the system comprising: an EPG application defined in an Hypertext Markup Language 5 (HTML5) based platform, the HTML5 EPG application presenting programming information defined within an EPG data window in the UI on the display device; and an EPG data manager module for providing EPG data received from one or more EPG data files to the HTML5 EPG application, the EPG data provided by scriptable data objects for the EPG data window, the scriptable data objects provided to the EPG application to render the EPG data window in the user interface on the display device.

In accordance with another aspect of the present disclosure there is provided a method of generating an electronic program guide (EPG) by a processor in a user interface presented on a display device, the method comprising: determining an EPG data window to be presented in the HTML5 EPG application in the user interface presented on the display device; generating at least one scriptable data object from EPG data based upon the determined EPG data window; and providing the generated scriptable data object to the HTML5 EPG application to instruct rendering of the EPG data in the user interface presented on the display device.

In accordance with yet another aspect of the disclosure there is provided A non-transitory computer readable memory containing instructions for generating an electronic program guide (EPG) by a processor in a user interface presented on a display device, the instructions comprising: determining an EPG data window to be presented in the HTML5 EPG application in the user interface presented on the display device; generating at least one scriptable data object from EPG data based upon the determined EPG data window; and providing the generated scriptable data object to the HTML5 EPG application to instruct rendering of the EPG data in the user interface presented on the display device.

Embodiments are described below, by way of example only, with reference to FIGS. 1-6. In order to provide a more efficient electronic programming guide (EPG) in an HTML5 implementation, an EPG data manager is provided to interface with an EPG application executed in an HTML5 browser based platform which may also use an interpreted language such as JS to provide the HTML5 EPG application or functions of the EPG application. An intermediary event handler may be provided to efficiently manage the EPG data for instructing rendering functions of an HTML5 EPG application. The EPG data manager enables an HTML5 EPG application that is memory efficient, provides good performance and is easy to customize by offloading EPG data management, decompression and navigation from the presentation of the EPG. The event handler interfaces between the EPG data manager and the EPG application to service EPG events from the EPG data manager and instruct the EPG application to render the EPG. The event handler can be provided using a scripting language such as JS providing functions that allow the HTML5 EPG application to configure the display window of the EPG data. The event handler notifies the HTML5 EPG application when the EPG data should be rendered based upon the scriptable data objects received from the EPG data manager. The format of the data passed via the event handler will notify the HTML5 EPG application which channels and programs in the EPG display window has been ADDED, REMOVED, or UPDATED to allow the HTML5 EPG application to update its display with minimal effort. Each scriptable data object also contains information to aid the EPG application in rendering the scriptable data object. The additional information can come in the form of CSS selectors for each scriptable data object, or may be provided as coordinates if other aspects of HTML5-integrated presentation technologies are utilized to display EPG such as for example but not limited to SVG, Canvas, WebGL and other alternatives. The EPG application can apply the CSS selector values to the HTML display element representing the scriptable data object to quickly render the EPG data. The CSS selector values are determined based on attributes of the EPG service and program. This approach allows the management of the EPG data and navigation in native code for optimal performance and memory utilization while allowing the rendering of the EPG application to be done completely in HTML5 for complete UI flexibility/customization.

FIG. 1 shows a representation of an EPG as presented on a display such as a television 100. The EPG 102 may be presented on the display by processing functionality integrated with the display, such as in a television, tablet, smartphone or by an external device such as a digital media receiver, for example a set top box device, which may interface with cable, satellite, wired or wireless networks to provide programming to the television display. Content may be delivered to the device by Internet Protocol (IP) services such as IPTV. The EPG may be presented in various formats, however it typically is presented in a grid 104 providing an EPG data window having a time dimension or axis and a channel dimension or axis displaying program titles positioned relative to their start and stop times. However, the EPG may alternatively be presented in different formats such as a Zap grid which shows a couple of channels and two fixed width columns with "Now" and "Next" programming, or a single channel grid which shows, for a channel, all programs as rows. The user can navigate the grid using directional input and select programs for viewing and possibly recording. Metadata on a particular program can also be displayed such as description, rating, recording status, duration, actors, air date, episode, etc. Although the EPG application may be capable of providing data that can be navigated through for numerous days, typically but not limited to 7 to 14 days, due to the presentation area of the display device 100 only a limited portion of the EPG data can be displayed by the EPG at any one time. As the user moves through the EPG, the EPG data must be retrieved and formatted for display which would be intensive if all the functions such as data retrieval, data extraction, navigation, formatting and rendering were performed within the HTML5 browser.

The EPG 102 is generated by an HTML5 platform based EPG application executed by a processor of the display device 100 or digital media receiver 200. The HTML5 EPG application renders the user interface and inserts the EPG data for formatting and display using HTML5 to provide flexibility in appearance and presentation. HTML5 applications typically utilize cascading style sheets (CSS) for describing the presentation semantics of the user interface to receive and process EPG data and determine user feedback and transitions. In addition, JS may be utilized for implementing portions of the EPG user interface and data interaction through control of CSS properties as well as other HTML5-integrated presentation technologies, such as SVG, Canvas, WebGL and other alternatives). HTML5 provides flexibility in allowing user interface to be readily implemented however the EPG user interface can limit the flexibility when tied to underlying data processing functions required for the EPG presentation due to the increased memory requirement when processing EPG data within the HTML 5 EPG application.

Figure 2:
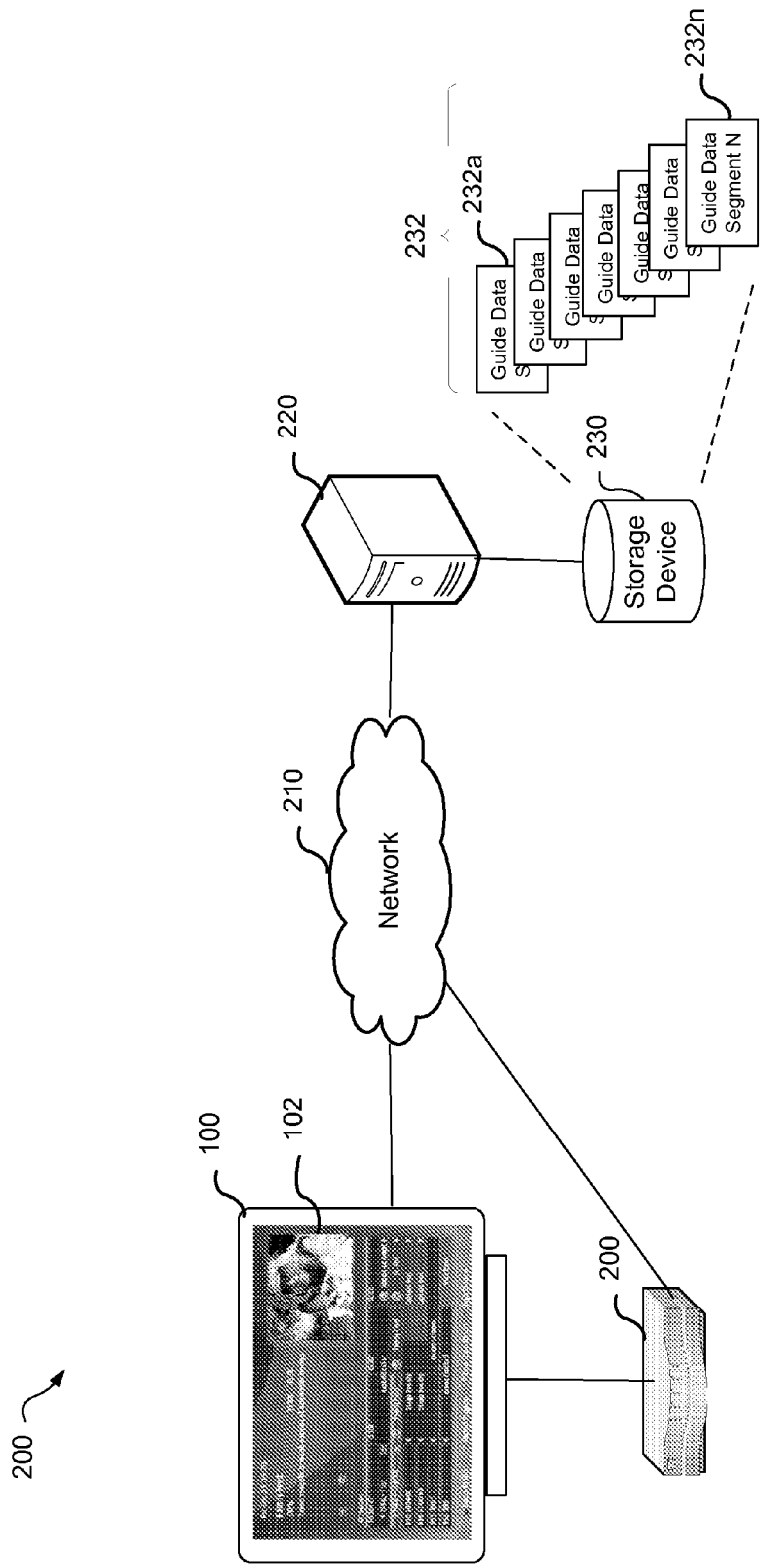
FIG. 2 shows a representation of EPG system.

FIG. 2 shows a representation of an EPG system. The EPG 102 may be presented in display device 100, but may be generated by a processor directly integrated with the display device 100 or by an external digital media receiver 200, such as a set-top box. The display device 100/digital media receiver 200 are capable of accessing a network 210 to receive or retrieve EPG data as well as the programming content for viewing. The network 210 may be a packet-switched network such as the Internet to provide IPTV service. A server 220 maintains EPG data 232 for access by multiple consumption devices such as display device 100 and digital media receiver 200. The EPG data 232 is stored on a storage device 230 in a single data file or in multiple segments in compressed data files 232a . . . 232n. The data files can be compressed using known compression formats such as zip, gzip, tar, rar, or a proprietary method. Depending on the particular implementation the compressed data files may be segmented by a time period and by groups of channels, content sources, program types or other metadata fields. If the EPG data 232 is provided in segments, the time period may for example be a range of three hours of data while the channel group may be defined by numeric ranges, alphabetical channel associations or programming packages. The EPG data 232 may be retrieved and decompressed on an as needed basis or the display device 100/digital media receiver 200 may maintain a sliding window of EPG data and download new data segments as they are available. For example the display device 100/digital media receiver 200 may maintain 14 days of EPG data and each night download new data files or segments, alternatively the display device 100/digital media receiver 200 may query the server 220 when the user moves to a position in the EPG that data is not present or defined at the display device 100/digital media receiver 200. Alternatively, the EPG data 232 can be provided by in-band data in the live TV streams to the display device 100/digital media receiver 200, either incrementally or as a periodic download of data for a defined period.

Figure 3:
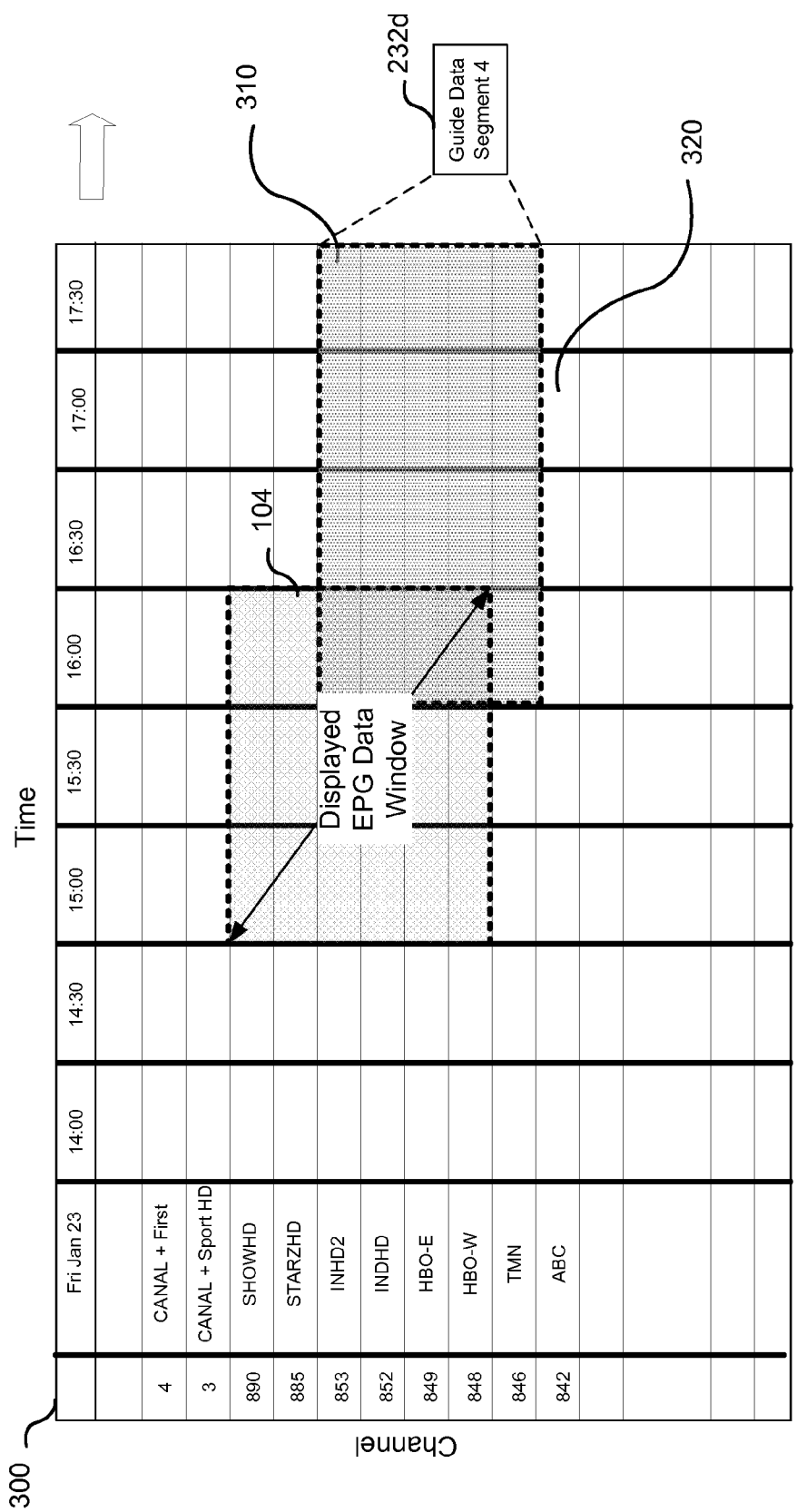
FIG. 3 shows a representation of an EPG data set and a data window.

FIG. 3 shows a representation of an EPG data set 300. The representation is intended to illustrate a data window of the EPG displayed data 104 within an EPG data set 300. The HTML5 EPG is typically presented in a two-dimensional format to present the program data where navigation within the EPG is limited to be within the EPG grid. The dimensions may for example be relative to channel and time axes, although the EPG information may be presented against different data such as genre data, cast data, language data, air date, description, time, etc. The EPG data may also be presented in alternative visual representations such a list or carousel structure that allows navigation of EPG data and may also be ordered relative to different metadata parameters. The grid is typically divided into half-hour blocks 310 however programs may not necessarily be associated with the defined blocks. The number of blocks 310 required for a program, or the number of programs associated with a block is dependent on the start time and duration of the associated programs. The EPG data, comprising the full EPG of 7 to 14 days may be divided into smaller segments for storage or delivered incrementally. For example a portion 320 of the EPG data may be provided by data segment 3 232d, where multiple segments are required to gather the data for the EPG data window. The smaller compressed segments enable the EPG to be easily updated, as only portions of the EPG need to be retrieved. The storage of the EPG data defines program information and does not need to be structured in a table format but in a flat file format with each program being associated with a channel and provide metadata information such as title, description, duration, start time, rating, etc. The displayed EPG data 104 may span multiple EPG data file segments and therefore require decompression of multiple files based upon the data window, or may be provided in a large compressed data file. As the user navigates the EPG grid additional data items may be requested for presentation. Executing decompression in HTML5 or in an intermediary plug-in can be intensive and sub-optimal in data representation efficiency and resource utilization. The EPG data manager provides a dedicated application implementation which can efficiently process EPG data, receive navigation inputs, determine scriptable data objects that need to be displayed and react to EPG application requirements.

Figure 4:
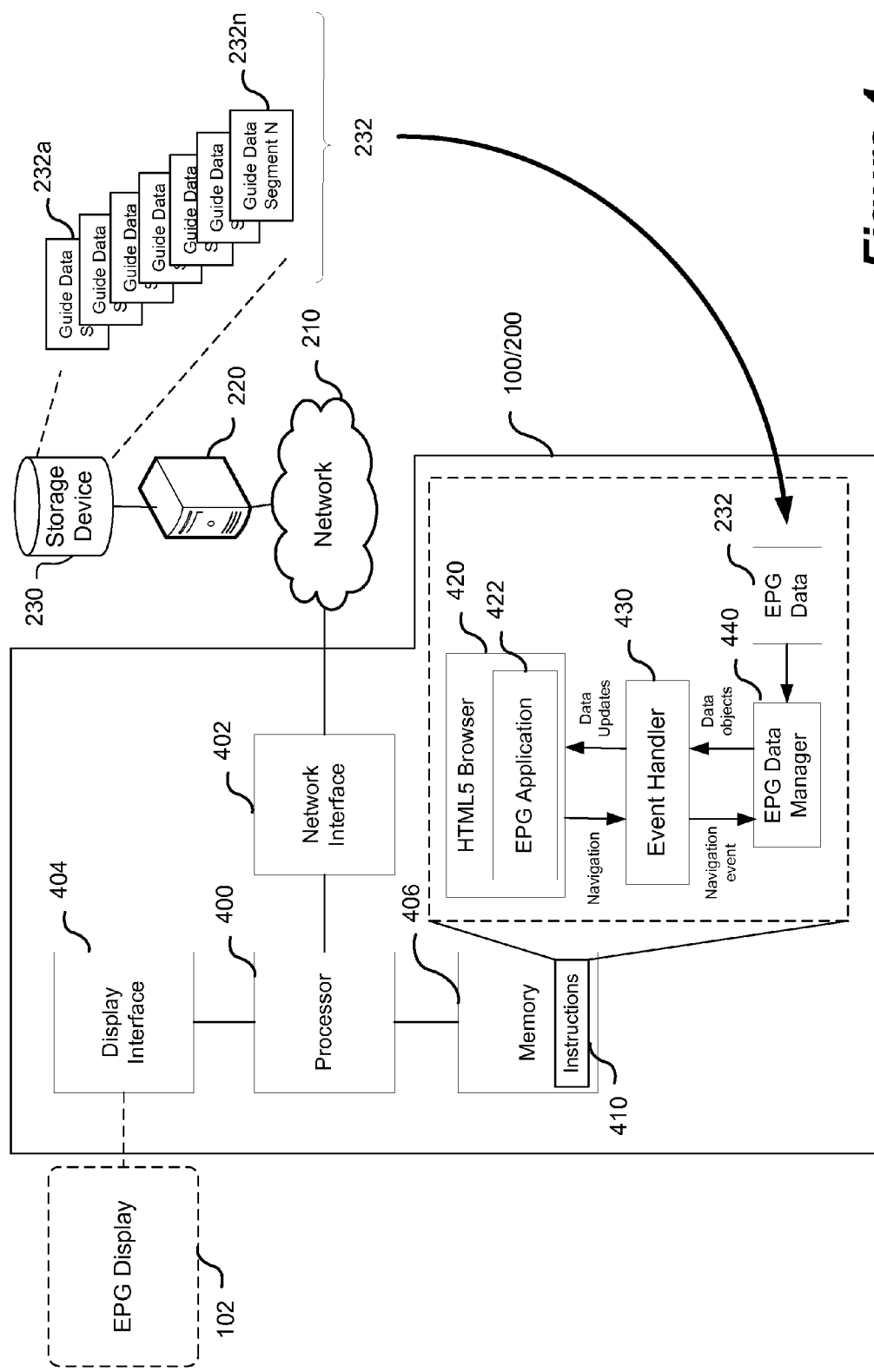
FIG. 4 shows a representation of a system for presenting an EPG.

FIG. 4 shows a representation of a system for presenting an EPG. The EPG 102 is presented by the display device 100/digital media receiver 200. The EPG 102 is generated by a processor 400 coupled to a memory 406. The memory 406 contains instructions 410 for generation and presentation of the EPG 102. A display interface 404 is coupled to a display device 100; the connection to the display interface 404 is dependent on where the EPG is generated by the digital media receiver 200, such as a settop box or directly in a tablet, smartphone or smart television. A network interface 402, which may be a wired or wireless interface, connects to the network 210 for retrieval of the EPG data 232, from storage device 230 coupled to server 220. The instructions 410 comprise an HTML5 browser 420 for providing a user interface to the user. The EPG application 422 can be presented by HTML5-integrated presentation technologies such as CSS defining the visual aspects of the EPG and may also provide function using JS. The event handler 430 can be JS interpreted by a JS engine and provide an application interface for EPG data manager module 440 to provide scriptable data objects to be used by the EPG application 422 to update the EPG data window 104.

The EPG data manager module 440 may be presented as a plug-in to the HTML5 Browser 420 and the HTML5 EPG application 422. The event handler 430 provides a defined interface to facilitate transfer of EPG data between the EPG data manager module 440 and the EPG application 422 and initiate visual updates by the EPG application 422 in response to EPG events such as navigation inputs or changes in EPG data or timeframes. The EPG data manager module 440 handles all complex functionality of the EPG application 422 such as navigation, caching and view window management. The EPG data manager 400 can be provided as a module within the HTML5/JS browser or as a native code application that is a compiled intermediate level language product such as C and C++ to compile directly to the hardware instruction set. In response to a navigation input or changes in the EPG data set, such as a time transition or programming changes, the EPG data manager module 440 determines the data for the view window that is displayed in the EPG application 422. The EPG data manager module 440 determines the EPG data required to update the data window to reflect the navigation or EPG data changes to modify the subset of EPG data displayed in the UI. The EPG data manager module 440 retrieves the required EPG data segment(s), if not already cached, and decompresses the data and provides the data objects via the event handler 430 to the EPG application 422 to update the EPG data window. The event handler 430 instructs the EPG application 422 to render the EPG components when the view window has been updated. The event driven infrastructure notifies the HTML5 EPG application 422 when portions of the EPG user interface display needs to be updated and limits the processing requirements on the EPG application 422. Calls from the EPG data manager module 440 providing a scriptable data object to the event handler 432 enables updates of EPG data to be provided to the EPG application 422 and pushed to the user interface. Functions may be performed such as providing an EPG data update to notify the user interface that the EPG display needs to be updated with the given EPG data, a time slot update to notify the user interface that the EPG visible time slots needs to be updated, or a focus/selection update to notify a change in the user-selected program to be displayed within the user interface.

Figure 5:
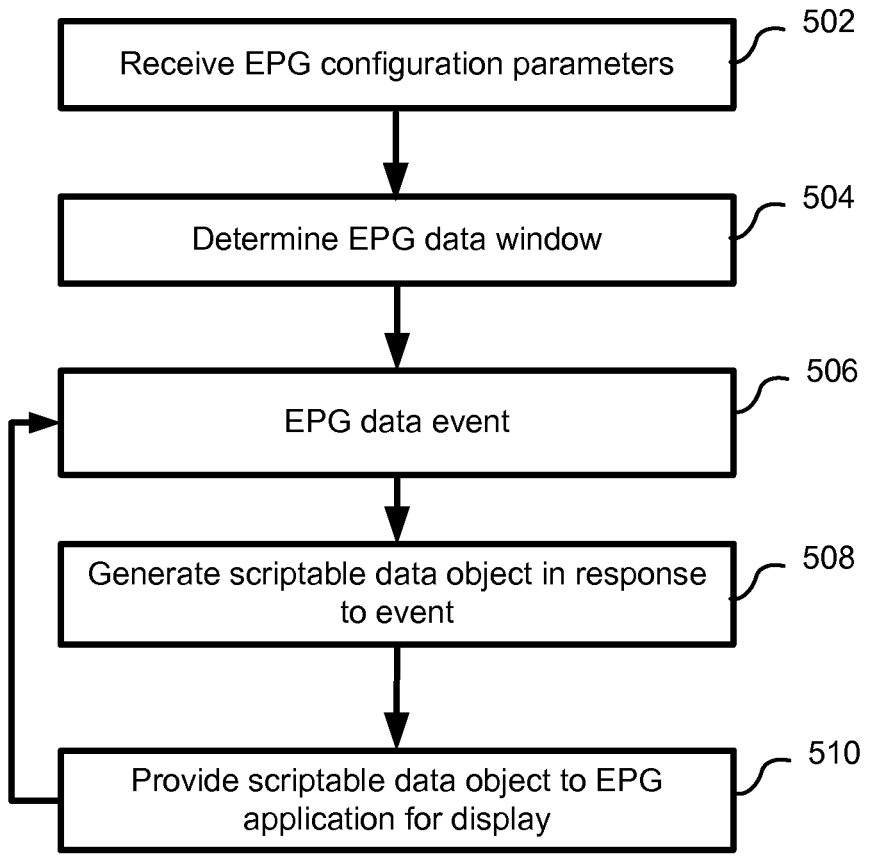
FIG. 5 shows a method of EPG data manager module.

FIG. 5 shows a method of EPG data manager 400 module. The HTML5 EPG application 422 configures the EPG data manager module 440 by calling a set of application programming interfaces (APIs) and providing parameters that identify the EPG data window (e.g. number of channels, time range), additional data such as CSS selector values based on channel/program attributes and an event handler callback. The event handler 430 provides the configuration parameters to the EPG data manager (502). Based upon the configuration the EPG data manager determines an EPG data window (504), and may retrieve compressed data files for the determined relevant portions of EPG data for the EPG data window. EPG events such as navigation events are triggered by the EPG application 422 calling APIs (e.g. next channel, previous channel, next program, previous program, go to channel and go to specific time) and providing the navigation event to the EPG data manager 440 (506). Alternatively the EPG event may be an EPG data event triggered by the EPG data manager 400 based upon changes in the EPG data or time that would trigger changes in the EPG data window (506) which are pushed to the EPG application 422. Based on the configured EPG data window the EPG data manager 440 will update the EPG data window by adding, removing or updating objects (channels, programs), for each added or updated object by determining the data associated with the EPG event by generating a scriptable data object (508). The EPG data is formatted by the EPG data manger module 440 into the scriptable data object and provided to the event handler 430 (510) to notify it that the display of the EPG data window needs to be updated. Data in the scriptable data object provided the event handler 430 enables the EPG application 422 to know which aspects of the EPG data window is to be updated, removed, added or unchanged, making it efficient for the EPG application 422 to update the display. Information in the event handler 430 also provides the CSS selectors for the visual aspects for each object if required, allowing the EPG application 422 to use CSS to simply apply these selectors to the display element of the scriptable data object. The EPG application 422 can display the scriptable data object with the desired effect without having to do any computation to retrieve, decompress and format EPG data reducing processing requirements on the EPG application.

Figure 6:
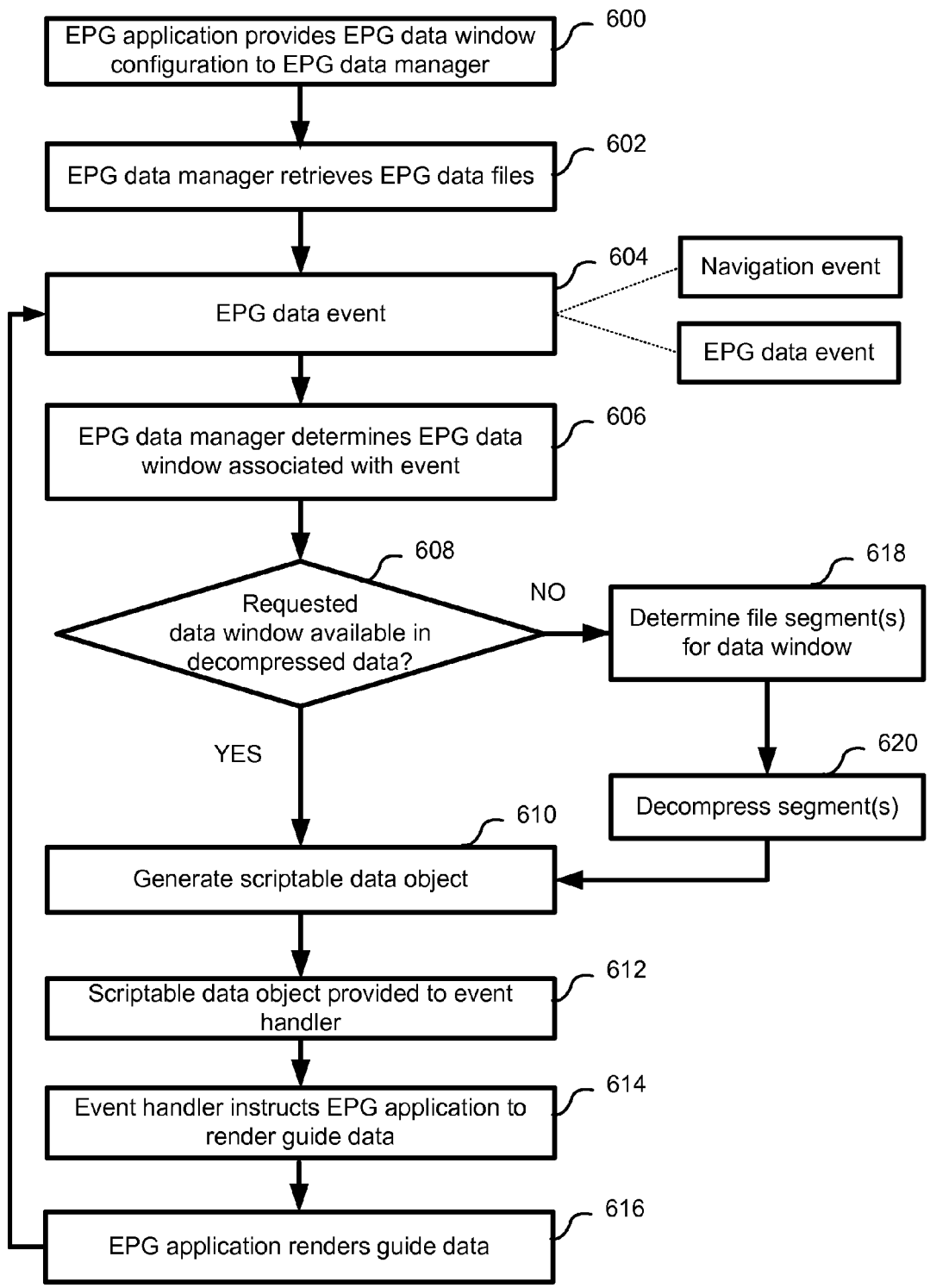
FIG. 6 shows a method of presenting an EPG data window in an EPG application.

FIG. 6 shows a flowchart of a method of presenting an EPG data window. The EPG application provides parameters defining the EPG data window to the EPG data manager (600). The data window defines the range of data that is required to be presented in the EPG based upon the user interface view shown on the display device. For example, when activating the EPG the default window may be based upon the current time and a listing of channels defined relative to the currently viewed channel. The EPG data manager retrieves or receives EPG data from a remote server (602). The EPG data is provided in a single compressed file, incrementally or may be provided in defined for segments of the EPG, for example an EPG may span three hours and cover a range of channels. The EPG data is centrally updated and stored and distributed to service providers. In order to provide a full EPG, for example 7 days, the data may be represented by hundreds of EPG data segments in the form of compressed files may be required to complete the EPG. Dividing the EPG into multiple file segments allows the EPG to be progressively updated with individual segments being added as required. Alternatively, the EPG may be provided incrementally or as a full periodic update providing a full EPG data window in the update. An EPG event is received by the EPG data manager (604) from user interaction within the EPG application, for example navigation input and is sent to the EPG data manager, or a change in the EPG data is determined by the EPG data manager. When the EPG view is displayed within the EPG application, the EPG data manager determines the size and range of EPG data window associated with EPG event (606). For example an incremental single line movement within the EPG where only one line is updated or a page increment where all data in the display is updated. In addition, the EPG data window is dependent on the current view selected for displaying the EPG and how much information can be viewed in that display. For example a typical grid formation may show a number of channels, vertically for a specific time period such as five channels for a three hour time period. The EPG may be displayed in alternative formats, for example where the channels are displayed horizontally or displayed for a single channel. Based upon the EPG events received, for example navigation events moving within the EPG grid, displaying a new channel group, changing the time period displayed, etc, the EPG data manager determines if the required data is available and has been decompressed to generate associated scriptable data objects. If the EPG data has already been previously cached (YES at 608) the EPG data is formatted into a scriptable data object (610) required to display the new information. The scriptable data object may define status actions such as ADDED, UPDATE, REMOVED, NOCHANGED, along with display CSS selectors based on the EPG data attributes that are provided to the event handler (612). The event handler then instructs the EPG application to update and render the user interface (614) using the updated scriptable data object. The EPG application can then render the EPG (616) to present the selected EPG data window. If the EPG data is not already decompressed (NO at 608), the appropriate file segment(s) for the data window is determined (618) or a request is provided to the server for an updated version of the EPG data. The retrieved file is decompressed (620) and the updated EPG data is formatted into a scriptable data object (610). Alternatively scriptable data objects may be generated in response to EPG data events such as EPG data changes based upon time or programming changes when the EPG is being viewed. When the scriptable data objects are generated by EPG events the EPG data manager will determine the required object and pass objects to the event handler.

Referring to FIG. 3, the EPG data manager may have data for most of the EPG data window, for example file segments 1-3 have been decompressed, whereas a portion of the window is not available and would require file segment 4 to be retrieved and/or decompressed. In addition, the EPG data manager may maintain a buffer window around the EPG data window to speed navigation or predictively decompress EPG data based upon previous actions.

Although the implementation is described relative a grid format EPG, the implementation may be utilized in other implementations such as carousel navigation.

In some embodiments, any suitable computer readable media can be used for storing instructions for performing the methods described herein. For example, in some embodiments, computer readable media can be transitory or non-transitory. For example, non-transitory computer readable media can include media such as magnetic media (such as hard disks, etc.), optical media (such as compact discs, digital video discs, Blu-ray discs, etc.), semiconductor media (such as flash memory, electrically programmable read only memory (EPROM), electrically erasable programmable read only memory (EEPROM), etc.), any suitable media that is not fleeting or devoid of any semblance of permanence during transmission, and/or any suitable tangible media. As another example, transitory computer readable media can include signals on networks, in wires, conductors, optical fibers, circuits, and any suitable media that is fleeting and devoid of any semblance of permanence during transmission, and/or any suitable intangible media.

Although the description discloses example methods, system and apparatus including, among other components, software executed on hardware, it should be noted that such methods and apparatus are merely illustrative and should not be considered as limiting. For example, it is contemplated that any or all of these hardware and software components could be embodied exclusively in hardware, exclusively in software, exclusively in firmware, or in any combination of hardware, software, and/or firmware. Accordingly, while the following describes example methods and apparatus, persons having ordinary skill in the art will readily appreciate that the examples provided are not the only way to implement such methods and apparatus.

The invention claimed is:

1. A system for presenting an electronic program guide (EPG) user interface (UI) on a display device, the system comprising:
    a processor coupled to the display device;
    a memory containing instructions which when executed by the processor for providing:
        an EPG data manager module for receiving one or more EPG data files defining EPG data from a server through a network and providing a subset of the EPG data as one or more scriptable data objects describing updated EPG data within an EPG data window, wherein the EPG data manager module decompresses EPG data from one or more files to retrieve the EPG data required for the EPG data window to generate the one or more scriptable objects;
        an EPG application defined in an Hypertext Markup Language 5 (HTML5) based platform, the HTML5 EPG application presenting EPG data defined within the EPG data window in the UI on the display device by receiving the one or more scriptable data objects from the EPG data manager and updating the presented EPG data in accordance with the one or more scriptable data objects, wherein the one or more scriptable data objects are determined by the EPG data manager based upon EPG events generated by the HTML5 application which will result in a change in the EPG data visible for display in the EPG data window.

2. The system of claim 1 wherein at least one of the one or more scriptable data objects is generated in response to the EPG event, wherein the EPG event is a navigation event generated by the EPG application changing the presented EPG data defined within the EPG data window.

3. The system of claim 1 wherein at least one of the one or more scriptable data object is generated in response to the EPG event associated with a change in the EPG data which results in a change in the EPG data window.

4. The system of claim 1 wherein at least one of the one or more scriptable data object is generated in response to the EPG event associated with a change in time resulting in a change in the EPG data window.

5. The system of claim 1 further comprising an event handler for providing EPG events to the EPG data manager module and receiving scriptable data objects from the EPG data manager module and instructing the EPG application to render the EPG using data from the scriptable data objects.

6. The system of claim 5 wherein the event handler generates navigation events in response to user navigation within the UI, the navigation event provided to the EPG data manager module.

7. The system of claim 5 wherein the EPG data manager module extracts EPG data larger than the EPG data window from one or more compressed EPG data files and caches data based upon predictive cache actions based upon EPG events received from the event handler.

8. The system of claim 1 wherein the EPG data manager module determines an EPG data file from a plurality of EPG data files based upon the EPG data window, each EPG data file containing programming data for one or more content sources for a defined time period.

9. The system of claim 1 wherein the EPG data manager module decompresses one or more compressed EPG data files.

10. The system of claim 1 wherein the EPG data manager module is a compiled intermediate level language product compiled directly to a hardware instruction set.

11. The system of claim 10 wherein the EPG data manager is generated in native code compiled from C or C++.

12. A method of generating an electronic program guide (EPG) by a processor in a user interface presented on a display device, the method comprising:
 determining in an EPG data manager module an EPG data window to be presented in Hypertext Markup Language 5 (HTML5) EPG application executed by the processor in the user interface presented on the display device, wherein the EPG data window is determined based upon a received EPG event from the HTML5 EPG application which will result in a change in the EPG data visible for display in the user interface on the display device;
 generating in the EPG data manager module at least one scriptable data object from a subset of the EPG data based upon the determined EPG data window, the at least one scriptable data objects describing updated EPG data within the EPG data window, wherein EPG data is decompressed from one or more files received from a server to retrieve the EPG data required for the EPG data window to generate the at least one scriptable object; and
 providing the generated at least one scriptable data object to the HTML5 EPG application to instruct rendering of the EPG data in the user interface presented on the display device.

13. The method of claim 12 wherein the EPG data windows is determined by receiving EPG configuration parameters from the HTML5 EPG application, the configuration parameters defining the EPG data window to be presented from the EPG data.

14. The method of claim 12 wherein determining the EPG data window further comprises receiving the EPG event, wherein the EPG event is a navigation event generated by the EPG application changing EPG data to be presented in the EPG data window wherein the scriptable data object is generated in response to the navigation event.

15. The method in claim 14 where each scriptable data object contains one or more Cascading Style Sheets (CSS) selectors that reflect the display state of the scriptable data object.

16. The method in claim 15 where the CSS selectors are calculated by the EPG data manager module based on the scriptable data object attributes.

17. The method of claim 12 wherein determining the EPG data window further comprises receiving the EPG event associated with a change in the EPG data therefore changing the EPG data window wherein the scriptable data object is generated in response to the EPG event.

18. The method of claim 12 wherein determining the EPG data window further comprises determining the EPG event based upon a change in time therefore changing the EPG data to be presented in the EPG data window wherein the scriptable data object is generated in response to the change in time.

19. The method in claim 12 where the EPG data is provided in one or more compressed files, wherein the EPG data is decompressed from the one or more compressed files to retrieve the EPG data to generate the scriptable data objects.

20. The method in claim 19 wherein determining the EPG data window further comprises:
 determining one or more compressed files that are associated with the data window;
 retrieving the determined one or more compressed files; and
 decompressing the retrieved one or more compressed files.

21. The method in claim 12 where each scriptable data object contain status information NOCHANGED, ADDED, UPDATED or REMOVED to aid to the EPG application in efficiently updating rendering of the EPG data window.

22. A non-transitory computer readable memory containing instructions for generating an electronic program guide (EPG) by a processor in a user interface presented on a display device, the instructions comprising:
 determining in an EPG data manager an EPG data window to be presented in Hypertext Markup Language 5 (HTML5) EPG application executed by the processor in the user interface presented on the display device, wherein the EPG data window is determined based upon a received EPG event from the HTML5 EPG application which will result in a change in the EPG data visible for display in the user interface on the display device;
 generating in the EPG data manager at least one scriptable data object from a subset of EPG data based upon the determined EPG data window, the at least one scriptable data objects describing updated EPG data within the EPG data window, wherein EPG data is decompressed from multiple data files to retrieve the EPG data required for the EPG data window to generate the at least one scriptable object; and
 providing the generated at least one scriptable data object to the HTML5 EPG application to instruct rendering of the EPG data in the user interface presented on the display device.

* * * * *